Feb. 27, 1934.    H. J. KERR    1,948,524
STEAM SEPARATOR
Filed Jan. 26, 1933    2 Sheets-Sheet 2

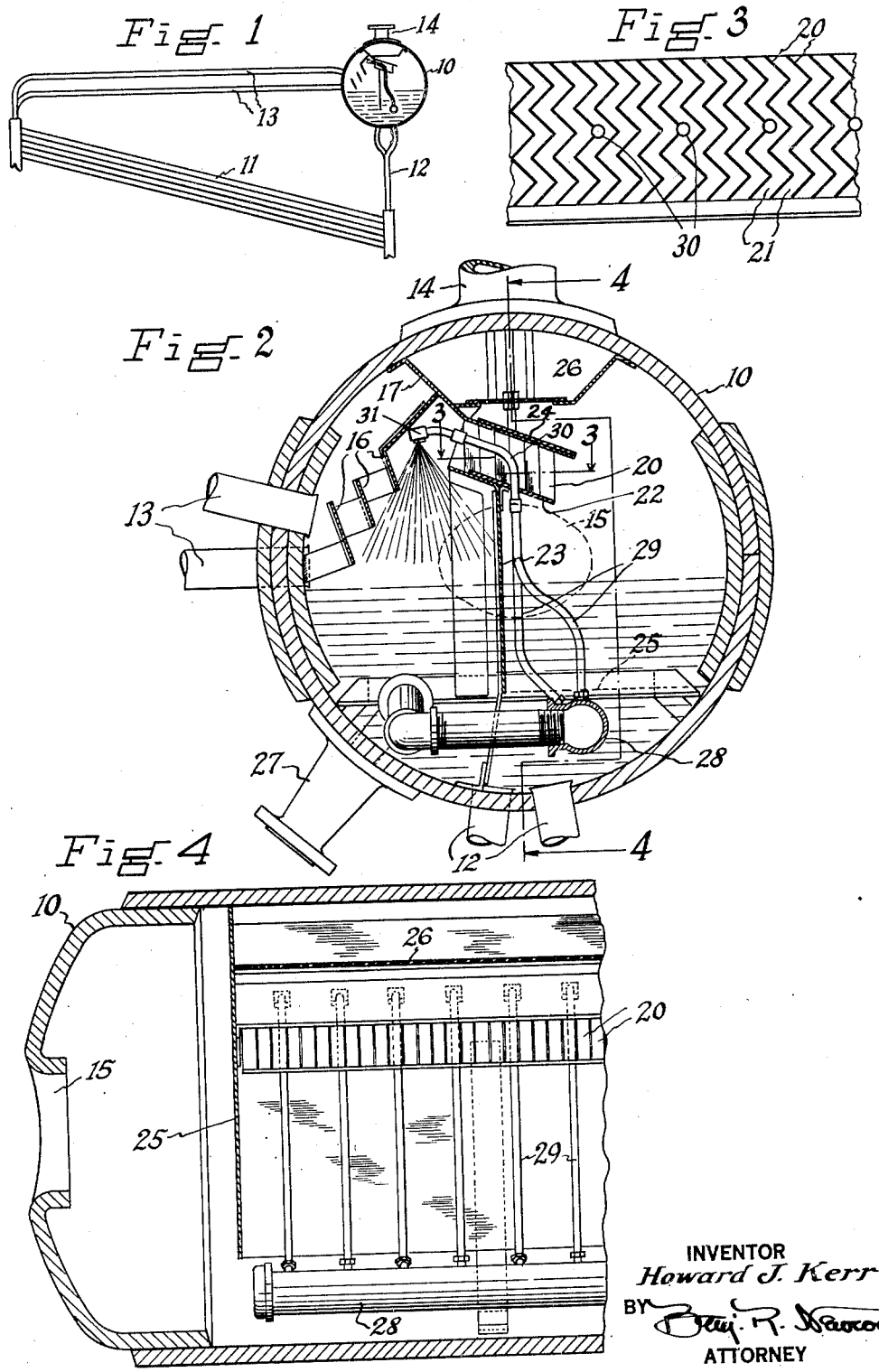

INVENTOR
*Howard J. Kerr*
BY
ATTORNEY

Patented Feb. 27, 1934

1,948,524

UNITED STATES PATENT OFFICE 1,948,524

STEAM SEPARATOR

Howard J. Kerr, Westfield, N. J., assignor to The Babcock & Wilcox Company, Newark, N. J., a corporation of New Jersey Application January 26, 1933. Serial No. 653,607

17 Claims. (Cl. 122—491)

The present invention relates to the construction and mode of operation of provisions for washing and drying steam, and particularly to an improved construction and arrangement of such provisions in the steam and water drum of a steam boiler.

The general object of my invention is the provision of simple and effective means for purifying and drying steam. A further and more specific object is the provision of steam washing and drying means especially adapted for use in a boiler steam and water drum and characterized by their effectiveness in operation at high steaming rates and high drum water levels, and by the accessibility of internal portions of the drum requiring periodic inspection and repairs. A further specific object is the provision of an improved method of purifying and drying steam as generated in a steam boiler.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 1 is a conventional illustration of a steam boiler incorporating my invention;

Fig. 2 is an enlarged view of the steam and water drum shown in Fig. 1;

Fig. 3 is a section on the line 3—3 of Fig. 2;

Fig. 4 is a section on the line 4—4 of Fig. 2;

Figure 5:
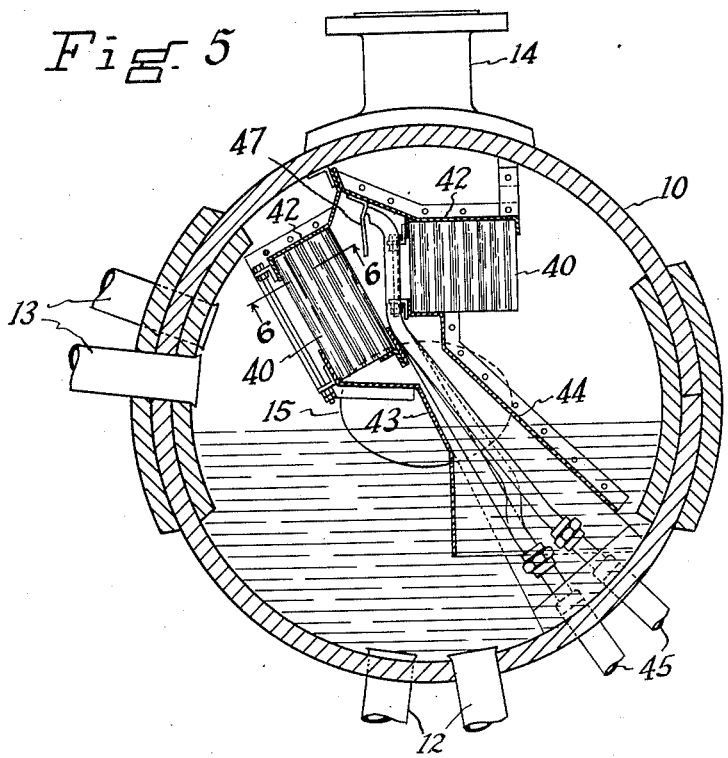
Fig. 5 is a view similar to Fig. 2 illustrating a modification.

As indicated in Fig. 1, my invention is particularly adapted for use in the steam and water drum 10 of a steam boiler of the Babcock & Wilcox cross drum type. A fluid circulation is established between the drum 10 and a bank of steam generating tubes 11 through downcomer tubes 12 connected to the bottom of the drum 10 and steam and water circulators 13 extending between the upper end of the tube bank and opening to the drum along one side thereof and above the normal water level therein. The steam and water drum when in use has a lower water space and an upper steam space, from which a steam outlet 14 permits the passage of steam to a superheater or turbine. Access to the portions of the drum to which the circulators 13 and downcomers 12 are connected is obtained through access openings 15 located in the drum ends.

The steam and water separating and washing provisions are suitably located in the steam space of the drum 10 between the discharge ends of the circulators 13 and the drum outlet 14, and in the embodiment illustrated in Figs. 1 to 4 comprise a primary separator unit or section consisting of a series of vertically inclined plates 16 extending longitudinally of the drum and spaced transversely of the drum with portions vertically overlapping. The plates 16 are arranged in front of the discharge ends of the circulators 13 and receive the impact of the incoming streams of wet steam and water. The lower end of the lowermost plate 16 is arranged adjacent the normal water level in the drum, while the upper end of the uppermost plate 16 is extended into contact with a seal plate 17 extending to the drum wall at the circulator side of the drum outlet. A substantial steam and water separation is effected in the primary separator section by the abrupt changes in direction given to the mixture. The primary separating action causes substantially all of the free water and some of the moisture suspended in the steam to be separated. The separated water drops into the water pool in the drum, while the wet steam flows inwardly toward a secondary separator unit or section.

The secondary separator section comprises a series of closely spaced imperforate zigzag or corrugated plates 20 arranged side-by-side longitudinally of the drum to form a series of relatively narrow sinuous channels 21 extending transversely of the drum. The plates 20 are vertically arranged to facilitate a gravital flow of the separated moisture to the bottoms of the channels 21. The separated moisture flows rearwardly along an inclined bottom closing plate 22, and into the portion of the water pool of the drum at the rear of a vertical seal plate 23, which extends from the plate 22 to below the water level. The upper ends of the channels 21 are closed by a top closing plate 24 to which the plate 17 is connected. End plates 25 close the ends of the drum steam space at the rear of the plates 23 and 17. A perforated dry pan 26 extends along the top of the drum below the outlet or outlets 14.

With this arrangement the wet steam entering the drum must pass successively through the separator sections and dry pan to reach an outlet 14. The wet steam will be divided into a series of thin parallel streams for its flow through the secondary separator section. As long as the velocity of the mixture entering the secondary section is not excessive, a substantial steam and water separation will be effected therein by impact and adhesion to the moisture collecting plate surfaces. The steam discharged from the secondary section is required to make a sharp change in direction to reach the dry pan and drum outlet, and any moisture remaining in the fluid tends to be separated by gravity in the velocity reducing space at the rear of the secondary separator section.

A limited amount of clean moisture is not highly objectionable in steam as such moisture would ordinarily be evaporated while the fluid was passing through the superheater. However, the moisture particles in the steam as generated ordinarily contain particles of solid material in suspension or solution, which tend to deposit in the superheater or turbine. In the present construction, purification of the steam is attained by washing the wet steam prior to its passage through the secondary separator section. The wash liquor used is preferably relatively pure feed water, i. e., feed water having a lower concentration of solids than the moisture suspended in the steam. This feed water is introduced into the drum in controlled quantities through an inlet pipe 27 connected to a manifold 28 extending longitudinally of the drum and from which longitudinally spaced branch pipes 29 extend vertically to spray pipes 30 incorporated in the separator unit and extending parallel to the fluid flow therein. The spray pipes 30 are each connected to a nozzle 31 arranged to discharge a spray of feed water downwardly into the space intermediate the separator sections. Thus, the wet steam before entering the secondary separator section must pass at a reduced velocity through a zone filled with relatively pure feed water which causes particles of relatively pure feed water to be added to the particles of boiler water suspended in the steam and correspondingly increase the size of the particles of suspended boiler water and decrease their solid concentration. The subsequent separation of moisture by gravity in the intersection space and on the moisture collecting plate surfaces of the secondary separator section correspondingly reduces the solid concentration of the steam.

While the apparatus heretofore described is suitable for obtaining steam of the desired dryness and purity at relatively low steaming rates, it has been found that as the rate of steaming is increased the separator sections become overloaded and are unable to deliver steam of the desired quality. The type of spray nozzle shown in Fig. 2 has also been found unsuitable for high steaming rates.

In Figs. 5-8, I have illustrated an embodiment of my invention which is capable of producing substantially pure dry steam at high steaming rates or high water levels in the drum. In this construction the primary and secondary separator sections are each formed by closely spaced imperforate plates 40 formed with a series of vertical shallow corrugations 40ª having reversely curved connecting portions. The plates are arranged side-by-side longitudinally of the drum to form sinuous or laterally undulating channels 41 extending transversely of the drum. In this construction, the primary section is spaced from the discharge ends of the circulators 13 with its lower end diverging therefrom, providing increased accessibility to the ends of the circulators and compensating for the inertia and gravity velocity components of the particles collecting on the plate surfaces. The upper ends of the channels 41 of each section and the intersection space are closed by top closing plates 42. Seal plates 43 and 44 extend from the lower forward corners of the primary and secondary separator sections, respectively, into the drum water space. The velocity of the wet steam entering the drum is diminished before it enters the primary separator section, through which the wet steam passes in a multiplicity of thin parallel streams. The top closing plate and seal plate of each section are advantageously proportioned to provide a larger effective outlet area than inlet area for each section, correspondingly reducing the fluid discharge velocity from each section. Moisture is separated in each section by adhesion with the moisture collecting plate surfaces. The arrangement and proportioning of the plate corrugations is such as to avoid a straight flow path for the steam and to provide sufficient turbulence to the flowing wet steam to bring substantially all portions thereof into contact with the plate surfaces during its passage therebetween.

Figures 6, 7, 8:
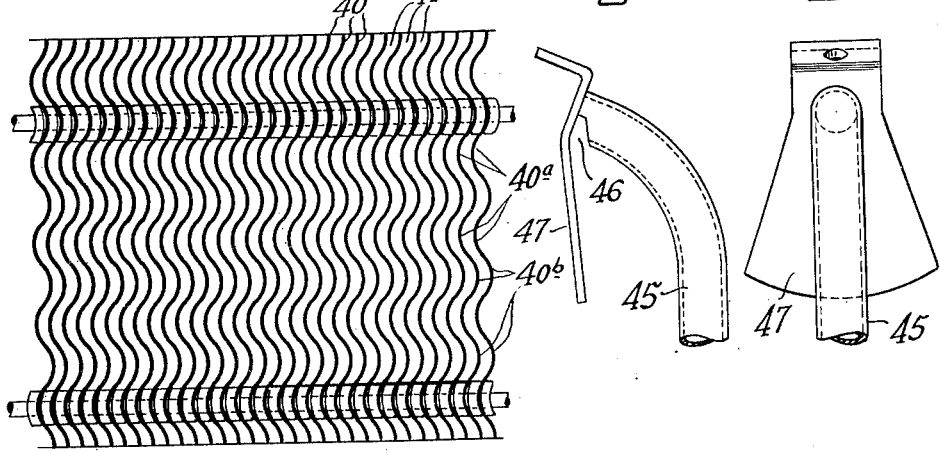
Fig. 6 is a section on the line 6—6 of Fig. 5.
Fig. 7 is an enlarged elevation of one of the spray nozzles.
Fig. 8 is a rear view of the spray nozzle shown in Fig. 7.

In this construction, the partly dried steam leaving the primary section is washed by relatively pure feed water introduced through a row of pipes 45 compactly arranged in the drum and extending upwardly between the sections. The pipes 45 terminate in circumferential discharge openings 46 alongside a flow spreading plate 47, as shown in Figs. 7 and 8. The washing liquid is discharged downwardly in a substantially solid sheet between the separator sections, establishing a water curtain through which the steam must pass before entering the secondary separator section. A concentrated discharge of the washing liquid has been found to be much more effective than a finely divided spray, inasmuch as when in the finely divided form, a greater proportion will be carried into the secondary separator section.

In both of the constructions illustrated, a major portion of the moisture carried by the steam is removed in the primary separator section. The positioning of the washing apparatus subsequent to the primary separator section reduces the velocity of the steam before entering the secondary section and provides a washing action at a point where the moisture carried by the steam has been considerably reduced. While, as shown, all of the make-up water is used for washing and the amount of wash water supplied will be therefore directly proportional to the amount of steam generated, only a variable portion of the make-up water need be used under certain conditions, and the amount of wash water manually or automatically regulated in accordance with the amount of steam generated and/or drum water level. In such cases, the water supply to the boiler would be insured irrespective of the condition of the spray nozzles. For example, the pipe 28 might also be provided with outlets directly to the water pool in the drum and controlled by the pressure in the pipe 28 or by the water level in the drum. The moisture carried by the steam entering the secondary separator section will consequently have a low solid concentration. During the passage of the treated steam through the secondary section, most of the remaining moisture carried by the steam will be removed and substantially dry steam with few, if any, solid impurities delivered at the drum outlet 14.

Certain subject matter disclosed in this application is disclosed and claimed in my prior pending application Serial No. 421,619, filed January 18, 1930.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators, a secondary section positioned in the path of flow between said primary section and drum outlet, and means for discharging relatively pure feed water into the steam prior to its passage through said secondary section.

2. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators, a secondary section spaced from said primary section and positioned in the path of flow between said primary section and drum outlet, and means for downwardly discharging relatively pure feed water into the steam during its passage through the space between said separator sections.

3. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators, a secondary section spaced from said primary section and positioned in the path of flow between said primary section and drum outlet, and means for downwardly discharging a sheet of relatively pure feed water into the steam during its passage through the drum space between said separator sections.

4. In a steam and water drum having steam and water circulators connected thereto along one side thereof and above the normal water level therein, downflow water tubes connected to the bottom thereof, and a steam outlet in its upper side, a steam and water separator comprising a primary section arranged in the path of the wet steam discharged by said circulators and a secondary section positioned in the path of flow between said primary section and drum outlet and comprising a plurality of side-by-side vertical plates forming narrow sinuous flow channels extending transversely of said drum, and means for downwardly discharging relatively pure feed water into the steam during its passage through the space between said separator sections.

5. In a steam and water drum having steam and water circulators connected thereto along one side thereof, downflow water tubes connected to the bottom thereof, and a steam outlet in its upper side, a steam and water separator comprising a primary section arranged in the path of the streams of steam and water discharged by said circulators and arranged to receive the impact of said streams, a secondary section positioned in the path of steam flow between said primary section and drum outlet and comprising a plurality of side-by-side bent plates arranged vertically and forming narrow sinuous flow channels extending transversely of said drum, and means for discharging relatively pure feed water into the steam prior to its passage through said secondary section.

6. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators and a secondary section positioned in the path of flow between said primary section and drum outlet, each of said sections comprising a plurality of side-by-side corrugated plates arranged vertically and forming narrow sinuous flow channels extending transversely of said drum, and means for discharging relatively pure feed water into the steam prior to its passage through said secondary section.

7. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators and a secondary section positioned in the path of flow between said primary section and drum outlet, each of said sections comprising a plurality of side-by-side corrugated plates arranged vertically and forming narrow sinuous flow channels extending transversely of said drum, and means for downwardly discharging a sheet of relatively pure feed water into the steam during its passage through the space between said separator sections.

8. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators and a secondary section positioned in the path of flow between said primary section and drum outlet, and means for downwardly discharging a sheet of relatively pure feed water into the steam during its passage through the space between said separator sections including feed water supply pipes extending upwardly through said space and terminating in a downwardly discharging nozzle.

9. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators and a secondary section positioned in the path of flow between said primary section and drum outlet, spaced seal plates closing the spaces between the bottoms of said sections and the water in said drum, and means for downwardly discharging a sheet of relatively pure feed water into the steam during its passage through the space between said separator sections including feed water supply pipes extending upwardly through the space between said seal plates and terminating in a downwardly discharging nozzle.

10. In a steam and water drum having steam and water circulators connected thereto along one side thereof, downflow water tubes connected to the bottom thereof, and a steam outlet in its upper side, a steam and water separator comprising a primary section arranged in the path of the wet steam discharged by said circulators and comprising a plurality of spaced overlapping vertical plates arranged to receive the impact of the wet steam, a secondary section positioned in the path of flow between said primary section and drum outlet and comprising a plurality of side-by-side vertical plates forming narrow sinuous flow channels extending transversely of said drum, and means for downwardly discharging relatively pure feed water into the steam during its passage through the space between said separator sections.

11. In a steam and water drum having steam and water circulators connected thereto along one side thereof, downcomers connected to the bottom thereof, and a steam outlet in its upper side, a steam and water separator comprising a primary section arranged in the path of the wet steam discharged by said circulators and comprising a plurality of spaced overlapping vertical plates arranged to receive the impact of the wet steam, a secondary section positioned in the path of flow between said primary section and drum outlet and comprising a plurality of side-by-side zigzag plates arranged vertically and forming narrow sinuous flow channels extending transversely of said drum, and means for downwardly discharging a sheet of relatively pure feed water into the steam during its passage through the space between said separator sections.

12. The method of reducing the solid concentration of wet steam generated in a steam generator from water having a high solid concentration which comprises subjecting the wet steam to a primary moisture separating action during which a substantial portion of the suspended moisture is removed, subsequently passing the partly dried steam through a steam space in intimate contact with feed water for the steam generator of less solid concentration than the moisture remaining in the steam, and subsequently subjecting the treated steam to a secondary moisture separating action.

13. The method of purifying and drying wet steam containing solids in solution or suspension in a boiler steam and water drum which comprises subjecting the steam to a primary steam and water separating action during which a major portion of the moisture is separated, passing the partially dried steam through a descending sheet of relatively pure feed water during which the moisture remaining in the steam is replaced by relatively pure moisture, and subjecting the treated steam to a secondary moisture separating action.

14. The method of purifying and drying wet steam containing solids in solution or suspension in a boiler steam and water drum which comprises subjecting a stream of moisture-laden steam to a primary separating action during which a major portion of the moisture is separated, passing the partially dried steam through an atmosphere of relatively pure feed water in which substantially all of the moisture remaining in the steam is replaced by relatively pure moisture, and subjecting the treated steam to a secondary moisture separating action during which moisture is separated by adhesion with a smooth undulating moisture collecting surface.

15. The method of reducing the solid concentration of wet steam generated from water having a high solid concentration which comprises subjecting the wet steam to a primary moisture separating action, subsequently passing the partly dried steam through a steam space in intimate contact with water of less solid concentration than the moisture remaining in the steam, and subsequently subjecting the treated steam to a secondary moisture separating action.

16. Steam treating apparatus comprising a casing having a dry steam outlet and an inlet for wet steam containing solids in solution in the suspended moisture, a steam and water separator comprising a primary moisture separating section arranged in the path of the wet steam entering said casing and a secondary moisture separating section positioned in the path of steam flow between said primary section and said steam outlet, and means causing the partly dried steam leaving said primary section to pass through a steam space between said primary and secondary sections in intimate contact with water of less solid concentration than the moisture suspended in the steam and subsequently through said secondary section.

17. Steam treating apparatus comprising a casing having a dry steam outlet and an inlet for wet steam containing solids in solution in the suspended moisture, a steam and water separator comprising a primary moisture separating section arranged in the path of the wet steam entering said casing and a secondary moisture separating section positioned in the path of steam flow between said primary section and said steam outlet, and means causing the partly dried steam leaving said primary section to pass through a steam space between said primary and secondary sections in intimate contact with water of less solid concentration than the moisture suspended in the steam and subsequently through said secondary section, each of said sections comprising a plurality of side-by-side corrugated plates arranged vertically and forming narrow sinuous steam flow channels.

HOWARD J. KERR.

CERTIFICATE OF CORRECTION.

Patent No. 1,948,524.                                February 27, 1934.

HOWARD J. KERR.

It is hereby certified that error appears in the printed specification of the above numbered patent requiring correction as follows: Page 2, line 13, for "fluid" read steam; and page 4, line 25, claim 11, for "downcomers" read down flow water tubes; and that the said Letters Patent should be read with these corrections therein that the same may conform to the record of the case in the Patent Office.

Signed and sealed this 11th day of September, A. D. 1934.

Leslie Frazer
Acting Commissioner of Patents.

(Seal)